Jan. 18, 1944.  M. F. JOY ET AL  2,339,409
ELECTRICALLY HEATED SHOULDER PAD
Filed Jan. 28, 1942  4 Sheets-Sheet 2

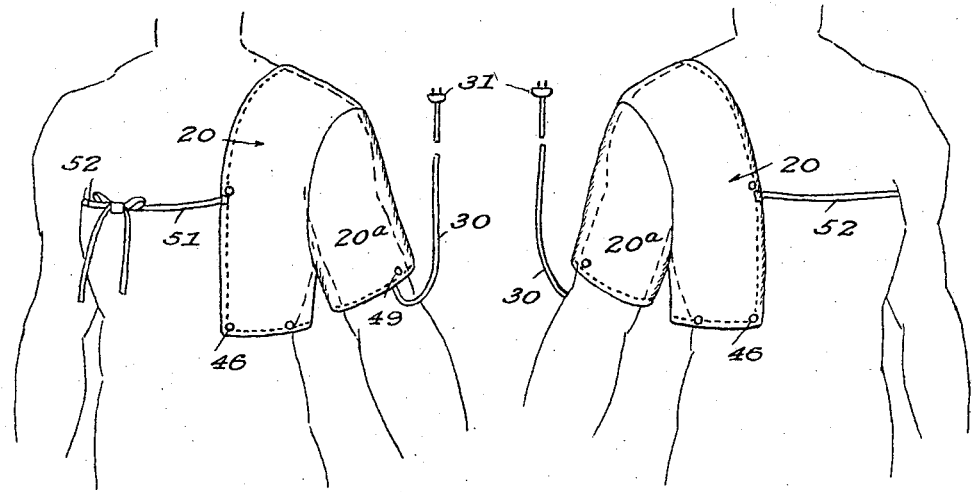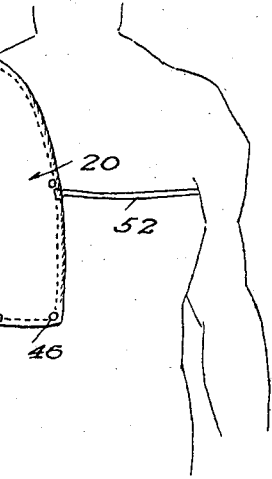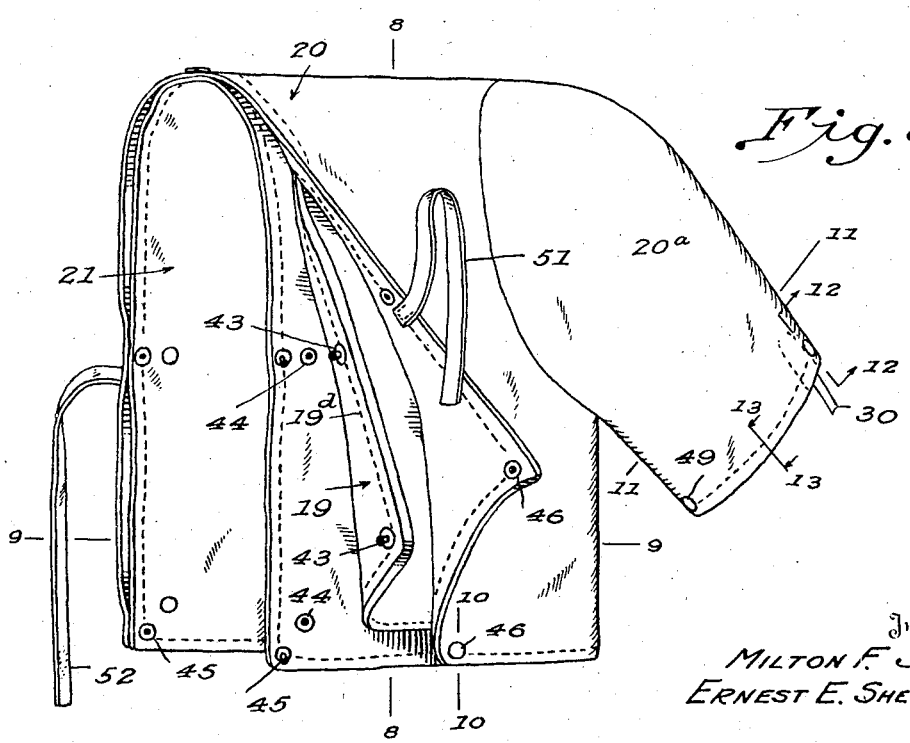

Inventors
MILTON F. JOY and
ERNEST E. SHEPARDSON

By Milans & Milans
Attorneys

Jan. 18, 1944.            M. F. JOY ET AL            2,339,409
              ELECTRICALLY HEATED SHOULDER PAD
                  Filed Jan. 28, 1942          4 Sheets-Sheet 3
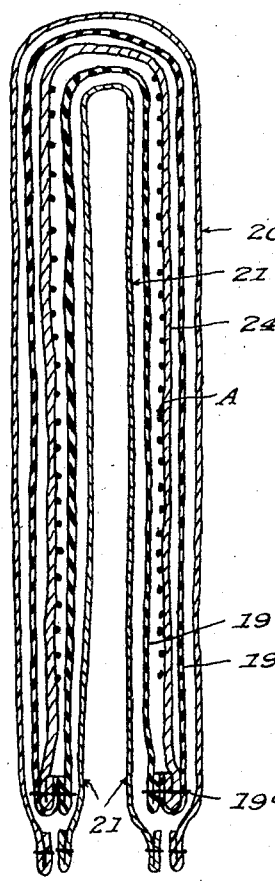
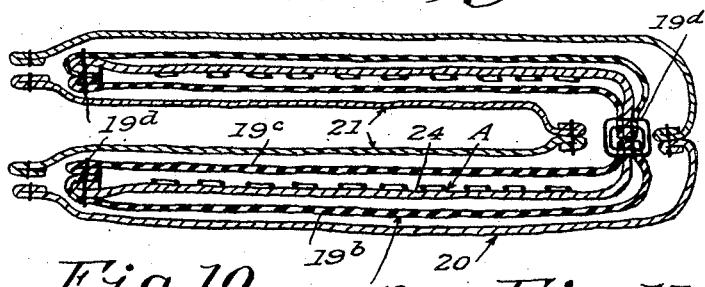
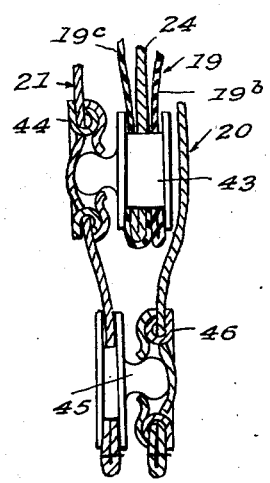
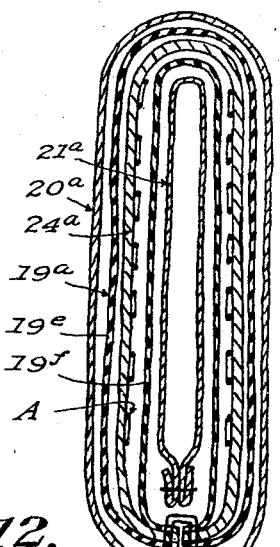
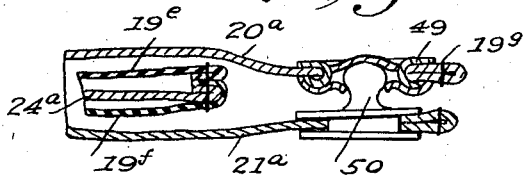
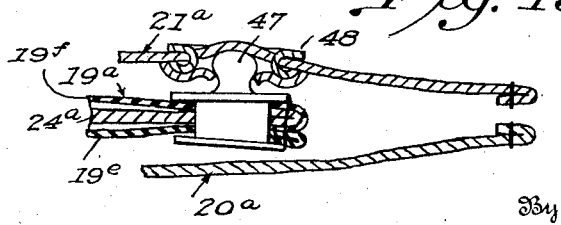
Inventors
MILTON F. JOY and
ERNEST E. SHEPARDSON
By
Milans & Milans
Attorneys Jan. 18, 1944.   M. F. JOY ET AL   2,339,409
ELECTRICALLY HEATED SHOULDER PAD
Filed Jan. 28, 1942   4 Sheets-Sheet 4
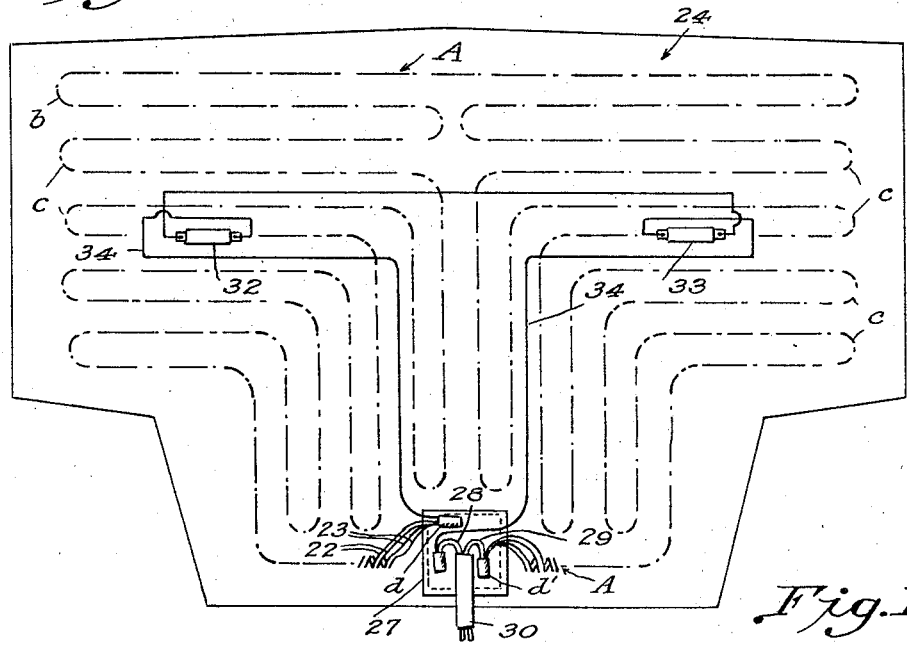
Fig. 14.
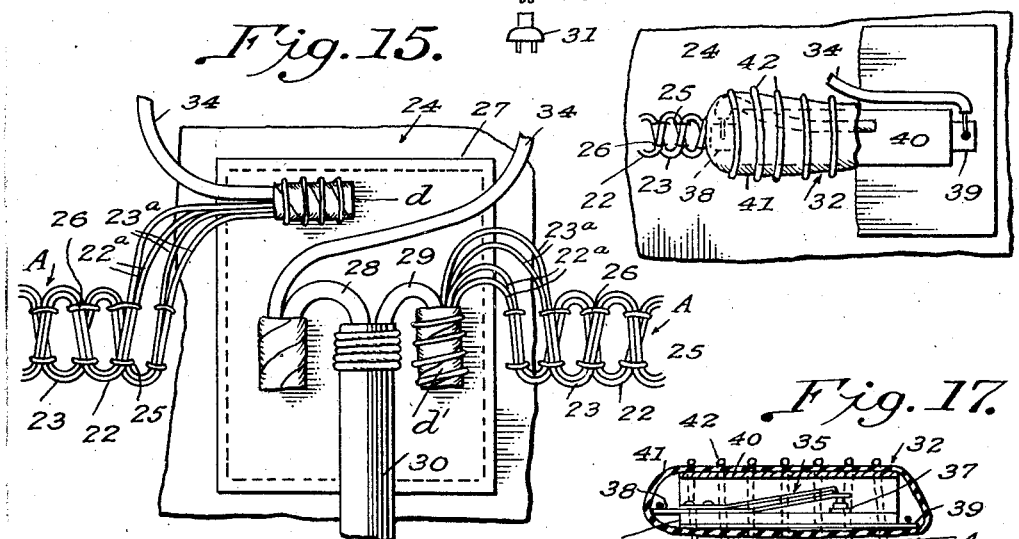
Fig. 15.   Fig. 16.
Fig. 17.
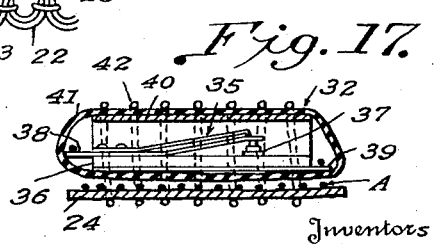
Fig. 18.
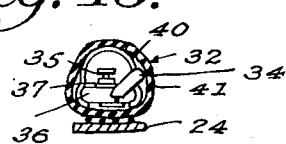
Inventors
MILTON F. JOY and
ERNEST E. SHEPARDSON
By Milans & Milans
Attorneys Patented Jan. 18, 1944

2,339,409

UNITED STATES PATENT OFFICE 2,339,409

ELECTRICALLY HEATED SHOULDER PAD

Milton F. Joy, Green Island, N. Y., and Ernest E. Shepardson, East Providence, R. I., assignors to Colvinex Corporation, Cohoes, N. Y., a corporation of New York Application January 28, 1942, Serial No. 428,622

3 Claims. (Cl. 128—402)

This invention relates to an improved electrically heated shoulder pad for local application of heat for medicinal purposes.

Objects of the invention are to provide an electrically heated shoulder pad of simple practical construction, that will fit comfortably on the shoulder, that can be easily applied and removed, and will remain in proper position during treatment to supply the desired heat over selected areas, and that will be efficient and safe in operation.

Another object of the invention is to provide a heating unit so formed and arranged as to provide for considerable heating structure within relatively restricted areas about the shoulder and for distribution of the heat as evenly as possible.

A further object of the invention is to provide a shoulder pad of the character referred to that will be durable and so constructed as to be readily kept in a sanitary condition.

The invention comprehends a shoulder pad having a portion to extend over the top, front and back of the shoulder, and a relatively short tubular portion to encompass the arm adjoining the shoulder, and comprising three separable sections, a main double-walled waterproof section providing a protective casing for the electric heating unit, an outer covering section and an inner lining section, the several sections telescoping with each other. The marginal portions of the outer covering section and the inner lining section extend beyond the marginal portions of the intermediate section and means is provided for detachably connecting the intermediate section at the marginal portions thereof to opposing marginal portions of the inner lining section, and for detachably connecting the inner section to the outer section at opposing marginal portions of said sections, together with adjustable attaching means connected with the outer covering section at the inner marginal portion thereof and adapted to extend therefrom around the opposite side of the body. By the special interconnection of the sections referred to, the intermediate double-walled section with the heating unit therein, is held spread out between the inner and outer sections and the same being connected with the outer section and being maintained in proper position in close fitting relation with the shoulder by the outer section when the attaching means that is connected to the outer section is adjusted about the body.

The invention, with other objects and advantages thereof, and the particular construction, combination and arrangement of parts comprising the same will be understood from the hereinafter contained detailed description when considered in connection with the accompanying drawings forming part hereof and illustrating one embodiment of the invention.

In the drawings:

Figure 1 is a front elevation of an electrically heated shoulder pad constructed in accordance with the present invention, the pad being shown applied to the body.

Fig. 2 is a rear elevation of the device as applied for use.

Fig. 3 is a perspective view of the device, the inner marginal portions of the outer covering section and the intermediate section of the pad at the front thereof being shown partially unfastened and turned back to expose the inner lining section and the intermediate section.

Fig. 8 is a vertical section taken substantially along the line 8—8 of Figure 3.

Fig. 9 is a horizontal section on the line 9—9 of Figure 3.

Fig. 10 is a fragmentary vertical section substantially on the line 10—10 of Figure 3 and looking in the direction of the arrow.

Fig. 11 is a transverse section on the line 11—11 of Figure 3.

Fig. 12 is a fragmentary vertical section taken substantially on the line 12—12 of Figure 3.

Fig. 13 is a fragmentary vertical section on the line 13—13 of Figure 3.

Fig. 14 shows diagrammatically the arrangement of the folds of the conducting wire of the heating unit on the flexible supporting section therefor.

Fig. 15 is a detail view, on a larger scale, of a portion of the supporting section for the heating unit, showing more in detail the heating unit structure and the terminal connection of the same.

Fig. 16 is a top plan view of a portion of the supporting section for the heating unit with one of the thermostats attached thereto.

Fig. 17 is a longitudinal section of the construction shown in Figure 16.

Fig. 18 is a transverse section of the construction illustrated in Figure 16.

Figure 4:
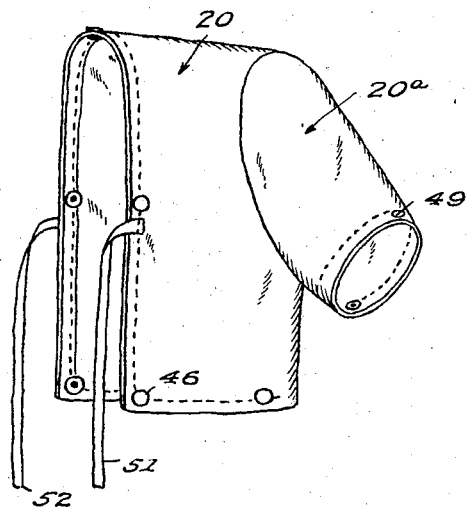
Fig. 4 is a detail perspective view of the outer covering section.
Figure 5:
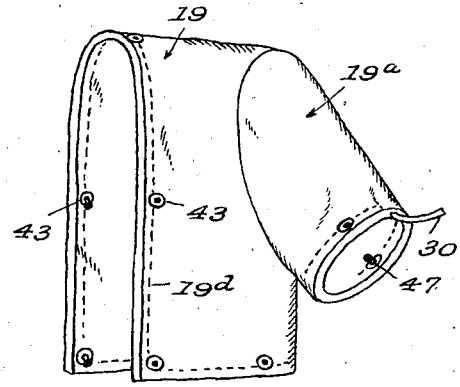
Fig. 5 is a detail perspective view of the intermediate section.
Figure 6:
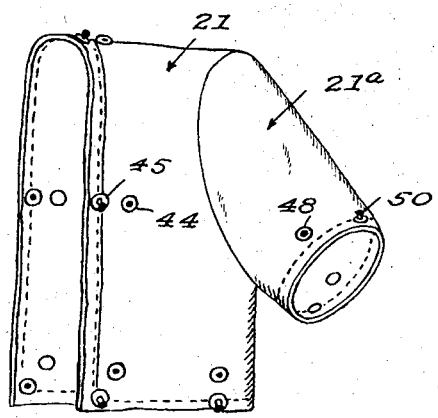
Fig. 6 is a similar view of the inner lining section.

While a preferred embodiment of the invention is illustrated in the drawings, it will of course be understood that minor changes and modifications may be made in the particular construction shown, and the invention may be embodied in other forms as will appeal to those skilled in the art and falling within the scope of the appended claims without departing from the spirit of the invention.

Referring to a detailed description of the particular embodiment of the invention illustrated in the drawings, the construction shown comprises three separable sections, a main section 19 constructed with double walls of waterproof material to provide a protective casing for the electric heating unit, an outer covering section 20, and an inner lining section 21. The outer covering section and the inner lining section are constructed of khaki or other suitable material. Each of the sections is formed as shown, to extend over the front, top and back of the shoulder and each has a short tubular portion to encompass the arm adjoining the shoulder, the tubular portions of the several sections being designated respectively 19$^a$, 20$^a$ and 21$^a$. As illustrated in Figures 8 and 9 of the drawings, the main portion of the intermediate section designated 19, is formed of separate sheets 19$^b$, 19$^c$ of waterproof fabric arranged back to back and connected at their lower and side marginal portions by stitching 19$^d$, and the short tubular portion 19$^a$ is formed by separate sheets 19$^e$, 19$^f$ connected at marginal portions thereof by stitching 19$^g$, the inner end marginal portions of the sheets 19$^e$, 19$^f$ of the tubular portion being suitably joined to the sheets 19$^b$, 19$^c$.

The intermediate section is preferably made of the material known in the trade as "neoprene cloth," which is resistant to all kinds of fluids commonly used for medicinal purposes, is highly resistant to the relatively high temperatures normally employed in different kinds of heating devices and which will not vulcanize or harden as sheet rubber coverings will.

The heating unit as illustrated in Figure 15, comprises a pair of conductor members 22 and 23, each of the members being bent back and forth to form a series of transverse loops and the members being reversely arranged in overlapping relation with the end bend portions of the loops of one conductor member disposed between end bend portions of the loops of the other conductor member to provide a strip-like structure designated A. The conductor strip A is attached to a flexible supporting section 24. The supporting section made of any suitable fabric, is similar in shape to the other sections, the same being formed to extend over the front, top and back of the shoulder and having a short tubular portion 24$^a$, said supporting section being disposed between the opposing walls of the intermediate section in telescoping relation therewith and being secured at its marginal portions to marginal portions of said walls by the stitching 19$^d$, 19$^g$. In Figure 14 of the drawings is illustrated diagrammatically the general outline of the material forming the supporting section 24 when spread out flat and with the heating unit laid thereon.

Figure 7:
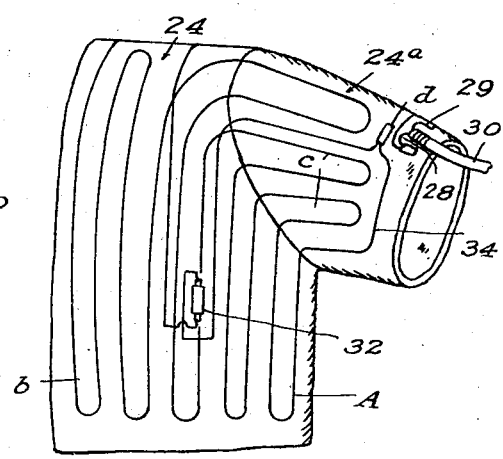
Fig. 7 is a front elevation of the flexible supporting section for the heating unit.

As shown in this view and in Figure 7, the conductor strip is arranged on the supporting section in a straight fold $b$ extending across the front, top and back of the supporting section and thence continues in a series of right angle folds $c$ in nested relationship at each side of the medial line of the top portion, so that each of the series of right angle folds has parallel legs extending transversely along the supporting section at right angles to the medial line thereof and with parallel legs extending substantially parallel with the medial line longitudinally of the tubular portion of the section, one of the series of said folds being disposed at the front and the other at the back of the supporting section. This special form of heating unit is well adapted to the general form and slope of the shoulder to provide for considerable heating structure within relatively restricted areas about the shoulder and for distribution of the heat as evenly as possible over the same.

The conductor strip is secured to the supporting section 24 by rows of stitching 25, 26. Opposite end portions $d$, $d'$ of the conductor strip are extended along the lower marginal part of the tubular portion 24$^a$ of the supporting section and are sewed down to the canvas reinforcement 27 on the supporting section, said end portions being first soldered and taped. The end portions $d$, $d'$ of the conductor strip are connected with lead wires 28, 29 of a short flexible cord 30 extending to the exterior of the intermediate section 19 at the outer end of the tubular portion 24$^a$ thereof and having a terminal connector plug 31.

The conductor members 22 and 23 forming the conductor strip A each consists of a plurality of thin easily flexible insulated wires 22$^a$, 23$^a$. In the particular embodiment of the invention shown in the drawings, the conductor members 22 and 23 each comprise two of said insulated wires composed of No. 38 metal core yarn, but, as will be understood in practicing the invention, the size and number of the component wires will vary, depending upon the heat desired. The insulated wires 22$^a$ and 23$^a$ are formed by threads of the construction disclosed in Patent No. 1,965,542, issued to William Colvin, Jr., July 3, 1934, composed partially of wire and partially of textile fibers, but which have qualities of softness, flexibility, and resistance to kinking, fairly comparable to like threads composed entirely of textile fiber, the metal wire core of the composite thread constituting the conductor wire of the heating unit, and the textile fiber wrappings of the composite thread forming the insulation of the conductor wire.

The pad is provided with temperature control means shown as comprising two thermostats 32 and 33, which are connected in series with each other and with the conductor strip A, the thermostats being interposed in a short conductor wire 34 leading from the terminal $d$ of the conductor strip to the lead wire 28 of the flexible cord 30. The thermostats are of conventional construction. The detail construction and arrangement of the thermostats is shown in Figures 16, 17 and 18. Each thermostat comprises a bimetallic bar 35 rigidly secured at one end upon a thin flat base 36 of electric insulating material and adapted to engage at its free end with a fixed contact 37 on the base. Each thermostat has a terminal 38 that is in electrical contact with the bimetallic bar 35, and with a terminal 39 that is in contact with the fixed contact 37, said terminals being connected in the conductor wire 34.

40 designates a cover member or shield of general U-shape form in cross section secured to opposite sides of the base 36. The structure is enclosed in a wrapper 41 of electric insulating tape or cloth and each thermostat is disposed lengthwise longitudinally of the transversely looped conductor strip A with its base 36 directly against a section of the looped strip. The thermostats are shown secured to the supporting section 24 by cord or thread 42 passed around the same and through the supporting section. Both thermostats are set to operate at the same temperature, two being provided at different locations along the conductor strip for increased safety in the operation of the pad. When the bimetallic bar of each thermostat is heated, it will flex out of engagement with the fixed contact, breaking the circuit. When the bar cools slightly it will again engage the fixed contact.

Means is provided for detachably connecting the intermediate double-walled section 19 at marginal portions thereof to marginal portions of the inner lining section 21 and for detachably connecting the outer covering section 20 to the inner lining section at the marginal portions of said sections. The means for this purpose comprises sets of cooperating snap fasteners arranged at intervals around the marginal portions of the sections. Referring particularly to Figures 3 to 6, 10, 12 and 13 of the drawings, 43 designates the series of snap fastener members on the inner side of the portion 19 of the intermediate section cooperating with fastener members 44 on the portion 21 of the inner lining section, and 45, 46 are cooperating sets of fastener members on the portion 21 of the inner lining section and the portion 20 of the outer covering section respectively; said last mentioned sets of snap fastener members being located outwardly of the marginal edge portion of the portion 19 of the intermediate section.

On the outer marginal portion of the tubular portion 19ª of the intermediate section are snap fasteners 47 and on the tubular portion 21ª of the inner lining section are cooperating fastener members 48. 49 and 50 are sets of cooperating fastener members on the tubular portion 20ª of the outer covering section and the tubular portion 21ª of the inner lining section positioned at intervals about the same outwardly of the outer marginal portion of the tubular portion 19ª of the intermediate section. Secured to the outer covering section 20 at the inner marginal portion of the same at the front and back thereof are tie strings 51 and 52 for securing said section on the shoulder of the patient and holding the three sections in place thereon. As shown in Figures 1 and 2 of the drawings, the tie strings 51 and 52 are secured to the outer covering section 20 well up on the upper part thereof to be arranged to extend from the outer covering section around the opposite side of the body at the upper part thereof just below the level of the arm pit, the free ends of the strings being tied together. As will be understood, through the means providing for detachably connecting the intermediate section 19 at marginal portions thereof to the inner lining section 21, and the connection of the latter section at marginal portions thereof to marginal portions of the outer covering section, the intermediate section with the heating unit therein, is held properly spread out between the outer and inner sections and when the pad is applied, with the short tubular portion 20ª of the outer covering section 20 encompassing the arm adjoining the shoulder at one side of the body, the intermediate section with the heating unit therein will be maintained by the outer section in proper position snugly fitting about the shoulder to effectively apply heat throughout the areas desired, when the tie strings that are connected to the inner marginal portions of the outer section are adjusted about the opposite side of the body and their free ends tied together.

In the use of the device, provision is made for operating the heating unit at a relatively low voltage from the regular service circuit of 110 volts usually found in dwellings and hospitals, a transformer of conventional construction, not shown, being provided to step down the ordinary service circuit to around 16 volts.

It will be noted that by the particular construction and arrangement of parts hereinbefore described, an electrically heated pad for local application of heat to the shoulder is provided, that is of simple, practical construction and will be efficient and safe in operation. The heating unit is well protected and is so formed as to provide for considerable heating structure within relatively restricted areas about the shoulder and for distribution of the heat as evenly as possible. The device can be easily applied and removed, it will fit comfortably on the shoulder, and will remain in proper position during use so that heat will be applied over the areas desired.

What we claim is:

1. An electrically heated pad for local application of heat to the shoulder and adapted to be applied and removed independently of any other garment structure, said pad comprising three separable sections, a main intermediate section, an outer covering section, and an inner lining section, each of said sections having a portion to extend over the top, front and back of the shoulder, the outer edges of the front and back portions being connected to each other, and a relatively short tubular portion to fit over the outer end of the shoulder and encompass the arm adjoining the shoulder, said sections telescoping with each other, the intermediate section being constructed with double walls of waterproof material to provide a closed protective casing therebetween, an electric heating unit disposed within said protective casing, means for detachably connecting the intermediate section at the inner marginal portion thereof to the opposing marginal portion of one of the other sections, means for detachably connecting the inner lining section and outer covering section at opposing marginal portions thereof outwardly of the intermediate section, and adjustable means connected to the outer section at the inner side marginal portion of the same at the front and back thereof and adapted to extend therefrom around the opposite side of the body for holding the pad in place.

2. An electrically heated pad for local application of heat to the shoulder and adapted to be applied and removed independently of any other garment structure, said pad comprising three separable sections, a main intermediate section, an outer covering section, and an inner lining section, each of said sections having a portion to extend over the top, front and back of the shoulder, the outer edges of the front and back portions being connected to each other, and a relatively short tubular portion to fit over the outer end of the shoulder and encompass the arm adjoining the shoulder, said sections telescoping with each other, the intermediate section being constructed with double walls of waterproof material to provide a closed protective casing therebetween, an electric heating unit disposed within said protective casing, means for detachably connecting the intermediate section at the inner marginal portion thereof to the opposing marginal portion of one of the other sections, means for detachably connecting the inner section at the inner marginal portion thereof to the opposing marginal portion of the outer section, means for detachably connecting the intermediate section at the outer marginal portion of its tubular portion to the opposing marginal portion of the tubular portion of one of the other sections, means for detachably connecting the inner section and outer section at opposing marginal portions of their tubular portions, and adjustable means connected to the outer covering section at the inner side marginal portion of the same at the front and back thereof and adapted to extend therefrom around the opposite side of the body for holding the pad in place.

3. An electrically heated pad for local application of heat to the shoulder and adapted to be applied and removed independently of any other garment structure, said pad comprising three separable sections, a main intermediate section, an outer covering section, and an inner lining section, each of said sections having a portion to extend over the top, front and back of the shoulder, the outer edges of the front and back portions of the section being connected to each other and a relatively short tubular portion to fit over the outer end of the shoulder and encompass the arm adjoining the shoulder, said sections telescoping with each other, the intermediate section being constructed with double walls of waterproof material to provide a closed protective casing therebetween, an electric heating unit disposed within said protective casing, means for detachably connecting the intermediate section at the inner marginal portion thereof to the opposing marginal portion of one of the other sections, means for detachably connecting the inner lining section at the marginal portion thereof to the opposing marginal portion of the outer section, and a pair of flexible attaching members, each secured at one end to the outer section at the inner side marginal portion thereof, one at the front and the other at the back thereof opposite the upper part of the relatively short tubular portion of said section, said flexible members being adapted to be arranged to extend around the body from the pad at approximately the level of the arm pit and be connected at their free ends to hold the pad in place.

MILTON F. JOY.
ERNEST E. SHEPARDSON.